United States Patent
Bentz et al.

[11] Patent Number: 5,101,779
[45] Date of Patent: Apr. 7, 1992

[54] CERAMIC LINK

[75] Inventors: Joseph C. Bentz; Thomas M. Yonushonis, both of Columbus, Ind.; Takashi Aoba, Ageo; Hiroshi Inoue, Kawaguchi, both of Japan

[73] Assignees: Cummins Engine Company, Inc., Columbus, Ind.; Toshiba Corporation, Japan

[21] Appl. No.: 641,707

[22] Filed: Jan. 15, 1991

[51] Int. Cl.$^5$ ............................................. F01L 1/16
[52] U.S. Cl. .............................. 123/90.61; 123/90.51
[58] Field of Search ............... 123/90.61, 90.62, 90.64, 123/90.51; 74/579 E

[56] References Cited

U.S. PATENT DOCUMENTS

| | | | |
|---|---|---|---|
| 4,629,707 | 12/1986 | Wolfe | 501/97 |
| 4,794,894 | 1/1989 | Gill | 123/90.61 |
| 4,806,040 | 2/1989 | Gill et al. | 123/90.61 |
| 4,848,286 | 7/1989 | Bentz | 123/90.61 |
| 4,966,108 | 10/1990 | Bentz et al. | 123/90.61 |
| 5,027,763 | 7/1991 | Mallas | 123/90.61 |

Primary Examiner—E. Rollins Cross
Assistant Examiner—Weilun Lo
Attorney, Agent, or Firm—Sixbey, Friedman, Leedom & Ferguson

[57] ABSTRACT

A ceramic link element suitable for use as a component in the drive train of an internal combustion engine is provided. The link includes a central shaft portion with opposed spherical terminal ends that contact correspondingly configured elements in the drive train. The ceramic link element is formed, preferably by injection molding, to be substantially free from flaws and to have maximum pore diameters, preferably a maximum pore diameter of 150 um or less on the shaft and 40 um or less on the spherical terminal ends, to produce a link with optimum mechanical strength. When these pore dimensions are met and the degree of sphericity of the spherical terminal ends is 20 um or less, the ceramic link exhibits increased mechanical strength, durability and reliability. A method of forming a ceramic link having the aforementioned characteristics is also provided.

9 Claims, 3 Drawing Sheets

CERAMIC LINK

TECHNICAL FIELD

The present invention relates generally to link structures for internal combustion engines and specifically to link structures for internal combustion engines formed of ceramic materials and to a method of making substantially flaw-free, strong, reliable ceramic links.

BACKGROUND OF THE INVENTION

The use of ceramic components in internal combustion engines has increased as engine manufacturers have discovered that the ceramic materials used for these components resist wear and have other desirable characteristics not possessed by the conventionally used metals. The use of ceramic materials can produce a dramatic reduction in wear when used to form engine components. Not only do ceramic engine components exhibit outstanding wear characteristics, but they also display high strength and are capable of withstanding thermal shock and corrosive environments. Moreover, these desirable characteristics are retained at the high temperatures and stresses typically encountered during internal combustion engine operation. The contact stresses to which a ceramic engine component can be subjected often approach 250,000 psi.

Structures including ceramic link elements proposed for use in internal combustion engines are the ball and socket joints of the fuel injector drive train and cylinder drive train components disclosed in U.S. Pat. No. 4,806,040 and the ceramic tipped pivot rods disclosed in U.S. Pat. Nos. 4,794,894 and 4,848,286. These patents, however, are not directed to longitudinal rod- or shaft-shaped link elements formed completely of ceramics, but are primarily concerned with the dimensional parameters of and tensile stresses on the ceramic parts of structures described therein. Moreover, they do not specifically address the improvement of mechanical strength and reliability of the ceramic elements.

U.S. Pat. No. 4,629,707 discloses a high strength ceramic element that can have a shaft configuration. However, the ceramic material from which this element is made is a low mass ceramic with an open porosity, the degree of which determines the strength of the element. A shaft made from the ceramic described in this patent is not likely to withstand the high compressive loads to which it would be subjected in a heavy duty diesel engine.

The formation of strong, reliable link structures useful in an internal combustion engine from ceramic materials is difficult. When a ceramic tip is mounted at the end of a metal element to produce the link, a specially configured mounting portion, such as those disclosed in U.S. Pat. Nos. 4,794,894 and 4,848,286, must be formed. Not only are such arrangements cumbersome and costly, but the bonding reliability between the ceramic and the metal tends to be low. In addition, wear resistance of the ceramic element may be unacceptable.

To avoid the problems associated with a combination ceramic-metal link, it has been proposed to form the link entirely of ceramic material. If the ceramic link must contact a metal surface during engine operation, both the contact surface and the shaft of the ceramic link must have sufficient mechanical strength to resist wear and continue to function for an acceptable period of time in a typical engine operating environment. Even if the ceramic link is an integral element made from a silicon nitride sintered body under predetermined manufacturing conditions, the mechanical strength of the shaft and the durability of the contact surfaces may vary from link to link. Therefore, a highly reliable ceramic link cannot be produced unless it is possible to reproduce the optimum mechanical and durability characteristics of the link during the manufacturing process.

The prior art fails to disclose a ceramic link element having a shaft integrally formed with spherical contact surfaces that may be manufactured in a way that provides reproducible optimum strength and durability. A need exists, therefore, for an integral ceramic link element for an internal combustion engine that may be manufactured to conform to acceptable strength and reliability parameters at low cost.

SUMMARY OF THE INVENTION

It is a primary object of the present invention, therefore, to overcome the disadvantages of the prior art and to provide an integrally formed ceramic link element that displays optimum strength and durability in an internal combustion engine environment.

It is another object of the present invention to provide a ceramic link element for an internal combustion engine wherein a central shaft portion and opposed spherical terminal end contact surfaces are integrally formed of a ceramic material of high strength and durability.

It is yet another object of the present invention to provide a ceramic link element for an internal combustion engine that is substantially free from linear flaws.

It is a further object of the present invention to provide a ceramic link element for an internal combustion engine having an optimum pore diameter defined differently to produce optimum mechanical strength in different parts of the link.

It is a still further object of the present invention to provide a ceramic link element for an internal combustion engine including spherical contact surfaces having a specifically defined spherical profile.

The foregoing objects are satisfied by providing a link element having a configuration useful in an internal combustion engine formed from a ceramic material capable of withstanding the adverse conditions found in the drive train of the internal combustion engine environment. The link element is integrally formed to include a longitudinal shaft portion and opposed substantially spherical terminal ends with substantially spherical contact surfaces at each end of the shaft portion. The maximum diameter of the pores in the ceramic material forming the shaft is 150 um or less, and the maximum diameter of the pores in the ceramic material forming the spherical terminal ends is 40 um or less. The shaft portion is formed to be substantially free of linear flaws, and the spherical profile of the spherical terminal ends is 20 um or less.

A method of forming a ceramic link element with this configuration and sufficient mechanical strength to function reliably is also provided. This method comprises the steps of forming a ceramic mold material from a mixture of a ceramic mold material and a suitable additive; rapidly injecting the ceramic mold material into a mold unit configured to form a predetermined link shape at a temperature and pressure sufficient to prevent interaction between air in the mold, generated gases and the ceramic mold material; removing the gate portion of the molded body and degreasing the molded body; and sintering the degreased molded body to produce a ceramic link element with a pore diameter of 150 um or less on the shaft and a pore diameter of 40 um or less on the spherical terminal ends.

Other objects and advantages will be apparent from the following description, claims and drawings.

DETAILED DESCRIPTION OF THE PREFERRED EMBODIMENTS

Ceramic elements used to replace corresponding metal parts have been found to provide increased wear resistance and durability over the metal parts in the internal combustion engine environment. When ceramic elements are used in engine components that typically experience loads approaching 250,000 psi, such as, for example, the drive trains, the ceramic replacements have demonstrated improved wear characteristics and have led to improved service life. In some instances, the replacement of metal drive train parts with corresponding ceramic elements permits operation of the engine without maintenance on the drive train components for up to 500,000 miles or more of vehicle travel. To attain this type of trouble-free operation, however, the ceramic element must be manufactured so that it is free from flaws or other surface irregularities that could lead to weakening or breakage of the element. Until the present invention, there has been no way to insure the manufacture and the reproducibility of manufacture of a substantially flaw-free ceramic element useful in the drive train or elsewhere in an internal combustion engine where the element is constantly subjected to high loads.

Figure 1:
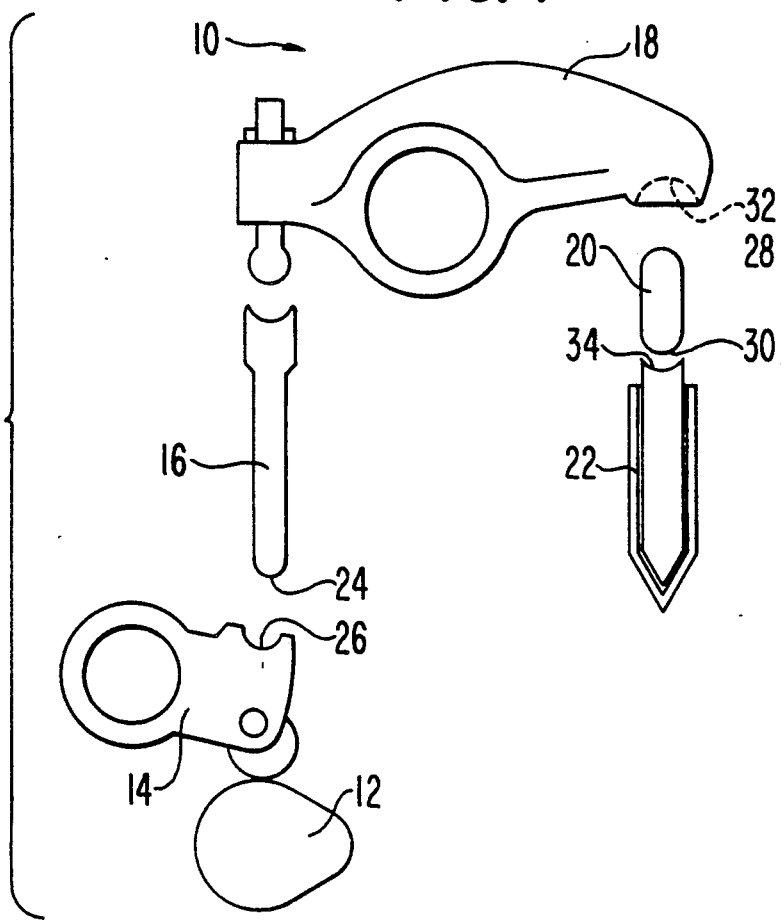
FIG. 1 is a schematic view of a fuel injector drive train incorporating a ceramic link element according to the present invention.

A common use of ceramic elements in internal combustion engines is in the formation of drive train components. FIG. 1 illustrates a fuel injector drive train 10 which includes several ceramic elements. An engine cylinder head valve drive train could also include similar types of ceramic elements, however. In the fuel injector drive train shown in FIG. 1, motion is transmitted from a cam 12 and pivoted cam follower 14 through a push tube 16, an injector rocker arm 18 and a modified push rod 20 to an injector plunger 22. Push tube 16 and modified push rod 20 may be formed from ceramic materials to impart increased durability and reliability to the drive train. Push tube 20 has a spherical terminal end 24 which, during engine operation, contacts a recess or socket 26 in the cam follower 14. Both terminal ends 28,30 of modified push rod 20 are rounded or have a spherical profile. Terminal end 28 contacts a recess or socket 32 in the rocker arm 18, and terminal end 30 contacts recess 34 in the injector plunger 22 during engine operation. The contact between the spherical terminal ends of the ceramic elements 16 and 20 and their corresponding sockets or recesses is a sliding type of contact that is highly loaded, with stresses commonly ranging from 80,00 psi to 120,000 psi. Unless these ceramic elements are substantially flaw-free, breakage could occur.

The mechanical strength of a ceramic element such as the modified push rod 28 is greatly influenced by linear flaws, such as small cracks, and by the numbers and sizes of the pores present in the ceramic element surface. When an external force is applied to the ceramic element, the stress will concentrate in the areas where cracks and pores are present. The larger the diameter of the surface pores in the ceramic, the more easily cracks will be formed by the application of even small external forces. The formation of cracks or other flaws in the ceramic element impairs the strength of the element and could lead to the destruction of the ceramic element during engine operation. Moreover, if the strength of a ceramic element, such as the link or modified push rod 20, is compromised, the drive train mechanism of the engine will not function properly or, in a worst case, will break down completely.

Figure 2:
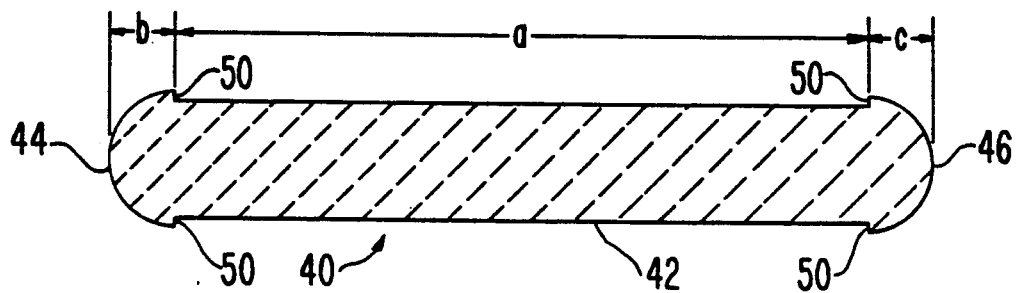
FIG. 2 is a cross-sectional view of a ceramic link element produced according to the present invention.

FIG. 2 illustrates, in cross-section, a ceramic element formed in accordance with present invention. The ceramic element 40 shown in FIG. 2 could be used as a drive train link, such as the modified push rod 20 in FIG. 1. This ceramic link has a central shaft portion 42 and opposed spherical terminal end portions 44 and 46. The shaft portion 42 extends along the distance represented by line a, and the spherical profile of the ends is defined within the boundaries represented by b and c. The strength of the ceramic shaft 42 determines the strength of the whole link. It has been determined that if a pore with a diameter of 150 um or greater is present on the surface of the shaft, the link 40 will have insufficient mechanical strength to function as required in the drive train of a diesel engine. Moreover, if either of the spherical terminal ends has a pore with a diameter of 40 um or greater, the reliability of the contact between the link spherical ends and their corresponding contact surfaces may be significantly impaired. If either or both of these conditions exists, the high wear resistance properties of the ceramic material forming the link element is not likely to be realized because the low mechanical strength of the link could cause it to break after only a short time.

The ceramic link element of the present invention is preferably formed from a ceramic material such as silicon nitride, SiAlON, silicon carbide, or zirconium oxide that has been sintered to increase wear resistance and mechanical strength. Particularly preferred for use in forming the present ceramic link is sintered silicon nitride with a fracture toughness value ($K_{Ic}$) of 5 MPa or greater.

Figure 3:
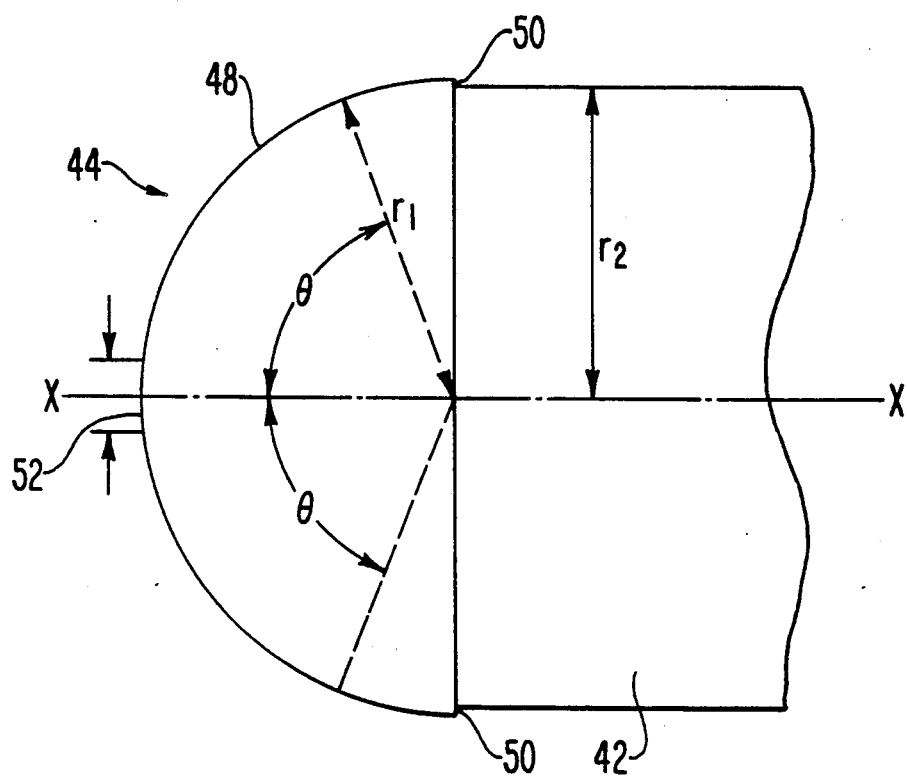
FIG. 3 is an enlarged view of one of the spherical terminal ends of the ceramic link of the present invention.

FIG. 3 illustrates an enlarged view of the spherical terminal end 44 of the link element 40 of FIG. 2. The spherical profile of terminal end 44 is formed so that the radius of curvature $r_1$ of the semispherical portion 48 of the end 44 is slightly larger than the radius $r_2$ of the shaft 42. Moreover, it is desirable to form a circumferential step 50 at the junction of the shaft and each terminal end. The step 50 prevents interference by the shaft 42 when the spherical terminal end is brought into contact with the correspondingly configured recesses or sockets during engine operation. In addition, the step 50 insures that the spherical contact surfaces of the ends 44 and 46 are free to move as required.

One portion of the surface of the spherical terminal ends of the link is essentially flat. This portion is represented at 52 in FIG. 3. This surface has a diameter which is about 1/5 to 1/10 of the radius of curvature of the semispherical surface 48. The substantially flat planar surface 52, which is perpendicular to the longitudinal axis of the shaft 42, delimits the minimum angle $\theta$ as shown in FIG. 3 at which the link can make sliding contact with the correspondingly configured recess of "gothic arch" geometry in an adjacent drive train or other component. This limits the minimum annular area of contact between the spherical end and the correspondingly configured recess and serves to limit the maximum specific unit loading between these two components.

The sphericity tolerance of the semispherical surface 48 is preferably set to be 20 um or less. If this surface contains any local indentations or does not have the sphericity defined herein, contact between this surface and its corresponding recess can wear the surface unevenly, which can decrease significantly the durability of the ceramic link. To produce highly precise contact between the spherical end 44 and its corresponding recess or socket, the semispherical surface 48 must have a precise spherical geometry, consequently, the spherical geometry of the spherical portion must have a sphericity of 20 um or less. If the sphericity is kept within these parameters, wear can be significantly decreased.

The mechanical strength of a ceramic link element, such as the modified push rod shown in FIG. 1, is dependent in large measure on the strength of the shaft portion of the link (shaft 42 in FIG. 2). The shaft will not have the requisite strength unless it is substantially free from linear flaws and surface pores with diameters exceeding specifically determined values. The present invention substantially eliminates both linear flaws and surface pores with diameters in excess of these specifically determined values. A linear flaw as described herein includes a small crack and has a major axis that is five or more times the minor axis. When a force is applied to the ceramic link, stress is concentrated on any linear flaws in the link, and these flaws tend to become cracks which ultimately destroy the link. Even when a linear flaw has a major axis that is less than five times the dimension of the minor axis, this flaw is a focus of stress concentration. Moreover, as the major axis of the flaw is increases, cracks will occur with the application of even less force to the ceramic link. which can significantly impair the mechanical strength of the link.

It has been determined that surface pores in the shaft of a ceramic link element which has the requisite mechanical strength to function as required in the drive train of an internal combustion engine must not have a major axis exceeding 150 um. In addition, the surface pores in the spherical terminal ends of a ceramic drive train element must not have a major axis exceeding 40 um. or these portions of the ceramic link are not sufficiently strong and durable under the harsh conditions encountered during engine operation. If these parameters for pore diameter are observed, however, the mechanical strength of the ceramic link element will be sufficient to withstand the loads of an internal combustion engine drive train.

The presence or absence of flaws and the size of the pores or any linear flaws in the ceramic element can be effectively detected by performing a fluorescent flaw detection test. Such testing, which can be conducted by any one of several methods known to those skilled in the testing art, should be performed on the ceramic link element prior to installation in the drive train or elsewhere in an internal combustion engine to determine whether linear flaws are present. Such testing can also ascertain whether the pores on the shaft and spherical terminal ends fall within the ranges defined by the present invention.

Although the most important characteristic of each pore with respect to the ability of the ceramic link element to withstand forces and stresses in the engine environment is the pore diameter, the number of pores present on the surface can also be a determinant of the mechanical strength of the ceramic link. The number of pores on the shaft 42 of the ceramic link should be 10 pores/mm$^2$ or less, and preferably 4 pores/mm$^2$ or less. The number of pores on each of the spherical ends 44 and 46 of the ceramic link should be 3 pores/mm$^2$ or less.

Figure 4:
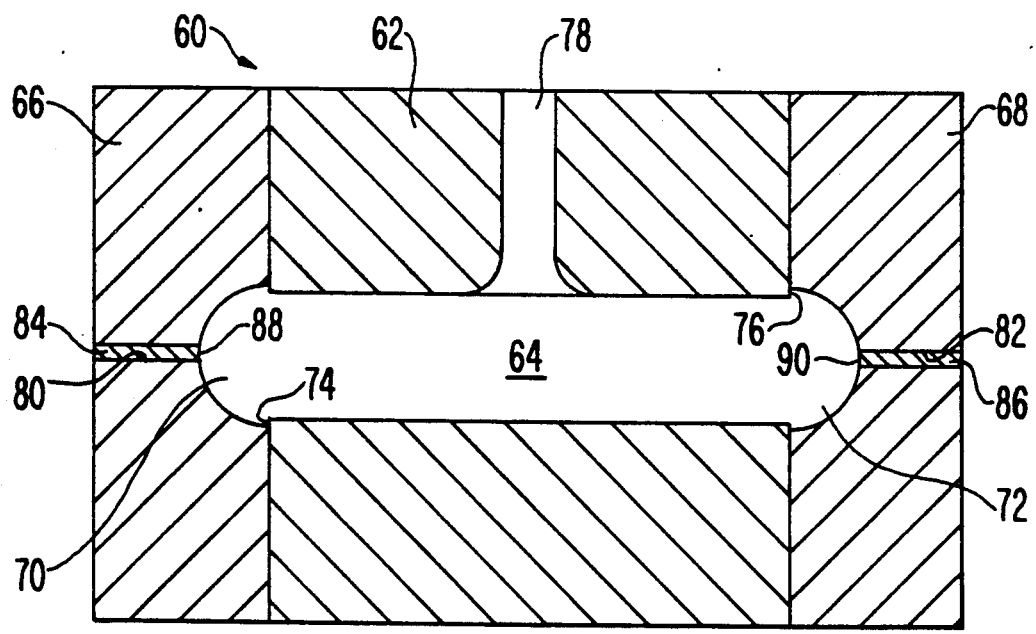
FIG. 4 is a cross-sectional view of an injection molding mold unit used to manufacture the ceramic link of the present invention.

A preferred method of manufacturing a substantially flaw-free ceramic link element capable of withstanding the stresses and forces present in an internal combustion engine drive train and meeting the aforementioned pore parameters is described in connection with FIG. 4. One method of producing a ceramic link element with spherical terminal ends integrally formed with a central connecting shaft is to form a columnar body by pressing, sintering the body and then mechanically working the sintered body to produce a link with the desired characteristics. However, the preferred method of producing a strong, substantially flaw-free ceramic link with the surface characteristics described above is by injection molding. According to this preferred method, a semi-finished molded body is first formed by injection molding, and this semi-finished body is sintered to produce a sintered finished surface, thus eliminating mechanical working of the ceramic surface and the possibility of producing either linear flaws or pores in excess of the optimum diameters.

A conventional injection molding mold unit used to manufacture a molded body with a shape similar to that of the finished product can be employed in the process of the present invention. FIG. 4 illustrates an injection molding mold unit 60 which can be used to form a ceramic link such as the modified push rod 20 in FIG. 1. This mold unit includes a shaft mold 62 with a cavity 64 having the same shape as that of the shaft 42 of the ceramic link. At each end of the shaft mold 62 are spherical terminal end molds 66 and 68 containing, respectively, cavities 70 and 72 for forming the spherical ends 44 and 46 of the ceramic link. Cavities 64, 70 and 72 together form one large integral cavity. Slight steps 74 and 76 are formed at the junction of cavity 64 and cavity 70 and at the junction of cavity 64 and cavity 72, respectively. As a result, the diameter of the shaft 42 is very slightly larger than the diameter of each of the spherical terminal ends 44 and 46. The shaft mold 62 is a two-part mold and includes a gate 78 in one of the mold parts. Central channels 80 and 82 are formed in each of the spherical end molds 66 and 68 substantially coaxially with the longitudinal axis of the shaft cavity 64. Air vent pins 84 and 86 are inserted into the respective channels 80 and 82. The pins are sized so that slight gaps, preferably about 0.01 mm to about 0.02 mm, are present between the pins and the channel walls when the pins are in place. The distal end portions 88 and 90 of the pins 84 and 86, respectively, are flat surfaces which intersect with each spherical end cavity 70 and 72. These flat distal end portions form flat contact surface 52 in the finished ceramic link. In addition, air vent grooves (not shown) are provided at the junctions between the shaft mold and each spherical terminal end mold.

A hot ceramic material, such as one of the preferred ceramics described above, is injected into the mold uniformly and rapidly to fill the cavities 64, 70 and 72 before it has a chance to cool. This is done rapidly and in a manner which prevents interference by the air in the mold and the gases generated by the mold material with the ceramic material. The rapid filling of the mold cavities with hot ceramic material eliminates air and other gas from the mold and thus prevents the formation of voids and surface defects and results in a smoother surface on the molded body than if these gases are not expelled from the mold. When the molded body has set, it is removed from the mold, the gate portion (not shown) is removed, and it is degreased and sintered to produce a ceramic link element such as the modified push rod 20 of FIG. 1. Although the ceramic link produced after sintering is fully capable of functioning in an engine drive train and will have the required surface characteristics, the surface of the link element may be processed further to smooth it even more. One suitable method of surface processing that may be employed is barrel processing.

The following example illustrates the method of forming a strong, durable ceramic link element suitable for use in the drive train or elsewhere in an internal combustion engine where it will be subjected to high loads:

EXAMPLE

To a silicon nitride powder with an average grain size of 0.8 um was added an additive with the following composition:

| Paraffin Wax | 50–65 wt % |
| --- | --- |
| Plasticizer and Lubricant (D.O.P.) | 20–35 wt % |
| Ethylene-Vinyl acetate Copolymer | 10–20 wt % |

25 parts by weight of the foregoing additive were added to 100 parts by weight of the silicon nitride powder. This mixture was kneaded at 100° C. to obtain a homogeneous mixture, and the homogeneous mixture thus produced was pulverized to obtain a ceramic mold material. The ceramic mold material was injected into the mold unit illustrated in FIG. 4 to form a molded body. During the injection molding process the temperature of the cylinder in the injection molding machine was 100° C.; the injection pressure (measured in the mold unit) was 40 MPa; and the molding cycle was 60 seconds.

The gate portion of the resultant molded body was removed by a grinder, and the molded body was heated from room temperature to 500° C. to degrease it. The degreased molded body was then sintered at 1750° C. for four hours to produce a ceramic link such as link 40.

This ceramic link was analyzed and measured to obtain the spherical profile and pore size. The radius of curvature of each of the spherical terminal ends (44,46 in FIG. 2) was 3.95 mm, and the sphericity of each semispherical surface (48 in FIG. 3) was 15 um or less. The surface roughness ($R_{max}$) was 3 um, and no surface defects were observed on the spherical terminal ends. The planar surface portion 52 (FIG. 3) had a diameter of 1 mm, and the step 50 (FIG. 3) between the shaft 42 and each spherical terminal end was 0.02 mm so that the shaft had a diameter 0.02 mm smaller than that of the spherical ends.

Figure 5:
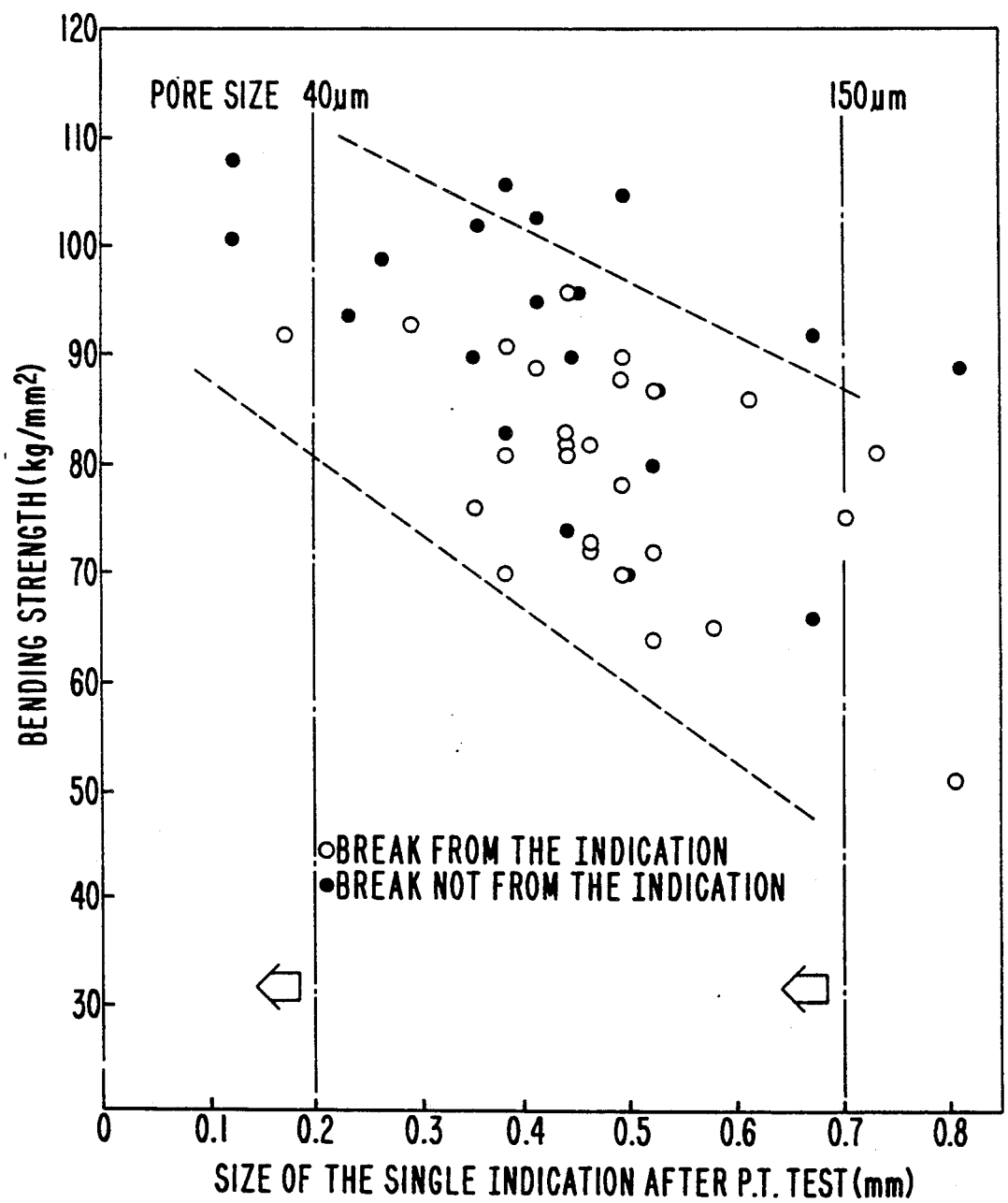
FIG. 5 is a graph showing the relationship between three-point bending strength and surface pore diameter of the ceramic link of the present invention.

A large number of ceramic links was manufactured as described in the foregoing example, and these links were subjected to fluorescent flaw detection tests. All flaws and pores present on the surfaces of the links were analyzed. Samples with linear flaws were eliminated, and a three-point bending test was performed for links having pores of different diameters. Each ceramic link was positioned so that a selected pore was located directly under a load point, and a destructive test was performed to evaluate the mechanical strength of the ceramic link on the basis of the load which caused the destruction of the link. FIG. 5 illustrates the relationship between pore diameter and the three-point bending strength for the ceramic links tested. The measurement results were classified into destruction caused by the load on the selected pore and destruction caused by other portions of the ceramic link. Since the pore size detected by the fluorescent flaw detection test was larger than the actual pore size, flaws or pores detected by the fluorescent flaw detection test were first converted to actual pore diameters and then evaluated.

FIG. 5 clearly shows that when the pore diameter is increased, the three-point bending strength is decreased. If the pore diameter is 150 um or less, the bending strength is 60 kg/mm$^2$, which indicates that the link shaft has the required mechanical strength to perform in the drive train of an internal combustion engine. Moreover, when the pore diameter is 40 um or less, the bending strength is 80 kg/mm$^2$. A bending strength of this magnitude indicates that the link has the mechanical strength to withstand the loads to which the contact surfaces of the spherical ends are typically subjected. A ceramic link able to withstand such loads will also have the durability required to permit the drive train to operate without servicing or replacing the ceramic link element for substantial numbers of vehicle travel miles.

Two groups of ceramic link elements manufactured as described above to have the spherical profile, pore sizes and numbers of pores defined herein were mounted as injection links (20 in FIG. 1) in fuel injection drive trains of diesel internal combustion engines, and a test equivalent to an actual vehicle travel test of about 160 thousand km was performed. The first group of ceramic links, which had pore diameters, pore numbers and sphericity within the parameters of the present invention, showed little wear and almost no decrease in mechanical strength as measured by a three-point bending test after the travel test. A second group of ceramic links having a sphericity of 20 um or more produced local wear in the socket which these links contacted.

The foregoing tests clearly demonstrate that the strength of the ceramic link is dependent on the pore size and, hence, the density of the ceramic. The higher the ceramic density is, the higher the mechanical strength of the link formed from the ceramic will be. The larger the size of the pores in the ceramic is, the lower the mechanical strength of the ceramic link will be. When ceramic links have pore sizes and numbers outside the parameters defined by the present invention, the mechanical strength of such links is compromised, and the links will not perform satisfactorily in engine environments where they are subjected to high loads. Ceramic links manufactured as described herein according to the parameters defined herein are both durable and strong and provide long service life at relatively low cost. Moreover, ceramic links with these desirable properties can be easily reproduced according to the present invention to provide reproducible reliability and superior wear resistance as components in internal combustion engines.

INDUSTRIAL APPLICABILITY

The present invention will find its primary applicability in the formation of drive train components for use in internal combustion engines. However, ceramic link elements made in accordance with the method described herein and according to the parameters defined herein will also be useful in applications where they can be employed as durable and reliable force receiving and transmitting elements.

We claim:

1. A link element for forming a component in the drive train of an internal combustion engine, wherein said link element includes a central longitudinal shaft means for supporting and connecting a pair of opposed integrally formed substantially spherical terminal end means for contacting correspondingly configured portions of adjacent drive train elements in the engine drive train, and said link element is integrally formed of a ceramic material so that the maximum diameter of the pores on said shaft means is 150 um or less and the maximum diameter of the pores on each said spherical terminal end means is 40 um or less.

2. A link element as described in claim 1, wherein said shaft means and each said spherical terminal end means is substantially free from linear flaws.

3. A link element as described in claim 1, wherein each of said spherical terminal end means has a spherical profile of 20 um or less.

4. A link element as described in claim 1, wherein the diameter of said shaft means is smaller than the diameter of each of said spherical terminal end means.

5. A link element as described in claim 4, wherein the diameter of said shaft means is 0.02 mm less than the diameter of each of said spherical terminal end means.

6. A link element as described in claim 1, wherein each said spherical terminal end means includes contact means for maintaining a sufficiently large area of sliding contact with said correspondingly configured portions of said drive train.

7. A link element as described in claim 6, wherein said contact means comprises a planar surface on each said spherical terminal end means perpendicular to the longitudinal axis of said shaft means.

8. A link element as described in claim 1, wherein said ceramic is a sintered ceramic material having a fracture toughness ($K_{Ic}$) of 5 MPa or greater.

9. A link element as described in claim 8, wherein said ceramic material is sintered silicon nitride.

* * * * *